June 13, 1967 G. F. SUTHERLAND 3,324,720
APPARATUS AND METHOD FOR DETERMINING RATE OF FLOW BY
MEASUREMENT OF ELECTRICAL PROPERTY OF STREAM
Filed July 29, 1963
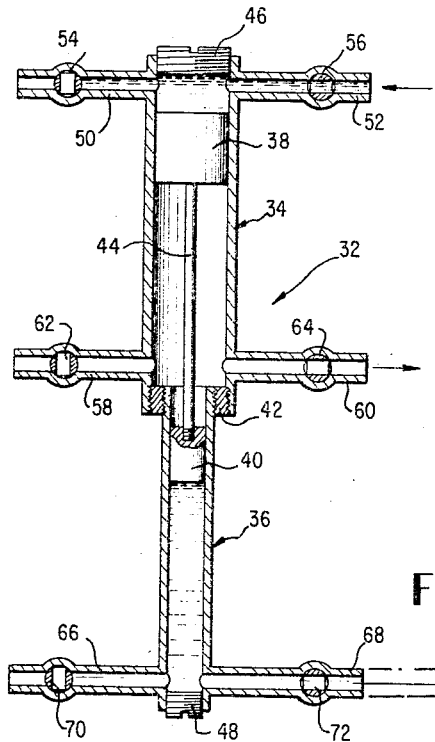
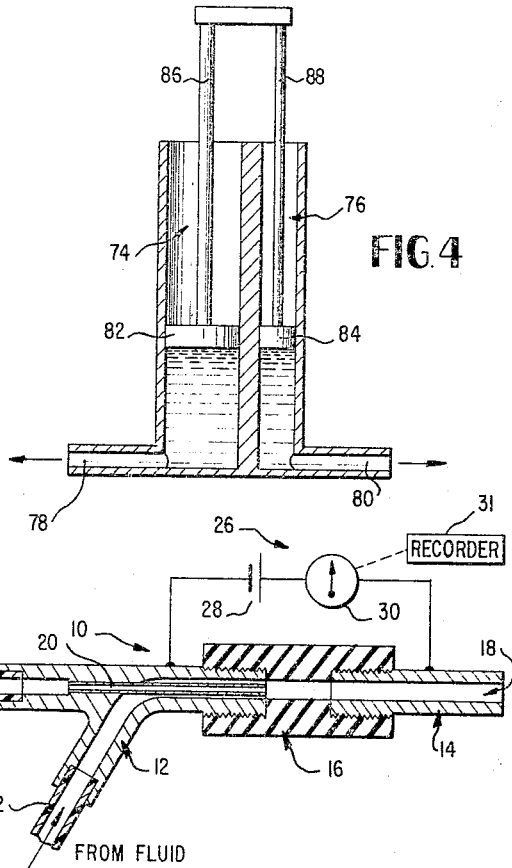
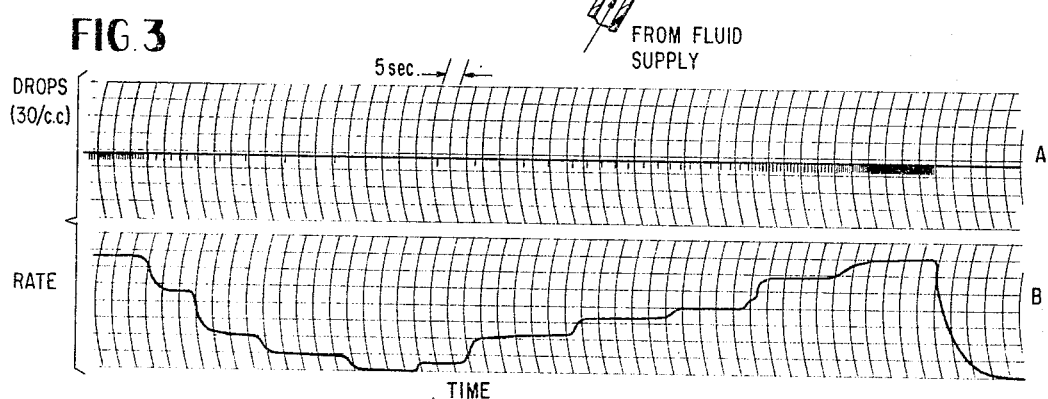
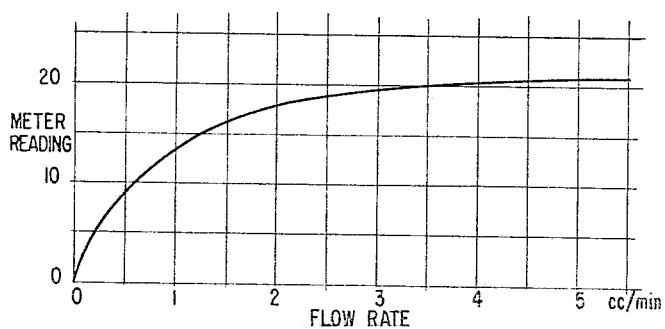
INVENTOR.
GEORGE F. SUTHERLAND
BY
*Shapiro and Shapiro*
ATTORNEYS

United States Patent Office 3,324,720
Patented June 13, 1967

3,324,720
APPARATUS AND METHOD FOR DETERMINING RATE OF FLOW BY MEASUREMENT OF ELECTRICAL PROPERTY OF STREAM
George F. Sutherland, Baltimore, Md., assignor, by direct and mesne assignments, of seventy-five percent to Friends of Psychiatric Research, Inc., Baltimore, Md., and twenty-five percent to Nelson H. Shapiro and Milton M. Field, Washington, D.C.
Filed July 29, 1963, Ser. No. 298,075
13 Claims. (Cl. 73—194)

This invention relates to flow rate measurements, and more particularly to apparatus and method for accurately measuring low rates of fluid flow, fluid leakage, or the like.

The present invention is especially adapted to the measurement of parotid secretion in man, but has diverse applicability. The measurement of parotid secretion is useful, for example, to detect stress and emotional instability in psychophysiological research or in conjunction with conventional polygraph techniques.

The difficulties encountered in the study of the salivary conditional reflex in man have to a large extent been due to failings in the available devices for such measurements. The relatively scanty and easily inhibited secretion in man has required a much higher degree of precision and sensitivity than has heretofore been possible.

In the Journal of Applied Physiology, volume 16, No. 4, July 1961, pp. 740–741, an apparatus is described which measures parotid secretion by means of a drop detector supplied with an electrolyte at a drop rate dependent upon the rate of parotid secretion. While the apparatus described represents a substantial improvement over prior apparatus, the reliance upon drop detection precludes the recording of a continuous curve displaying instantaneous flow rate as a function of time. The present invention provides a simple, yet highly accurate and sensitive apparatus and method for producing such a curve.

It is accordingly a principal object of the invention to provide improved apparatus and method for the measurement of flow rate, especially low flow rates.

A further object of the invention is to provide improved apparatus and method for measuring flow rate and in which the instrumentation can be completely isolated from the flow to be measured.

Still another object of the invention is to provide apparatus and method of the foregoing type which may be utilized for the measurement of rate of collection or rate of delivery of a fluid.

Briefly stated, the invention utilizes the measurement of conductivity (or resistance) of a path in a stream of combined substances, one of which is preferably a carrier fluid, which may be supplied at a constant rate, and the other of which is preferably a fluid of different conductivity, which may be supplied at a rate to be measured.

The foregoing, and other objects, advantages and features of the invention, and the manner in which the same are accomplished will become more readily apparent upon consideration of the following detailed description of the invention taken in conjunction with the accompanying drawings, which illustrate preferred and exemplary embodiments of the invention, and wherein:

FIGURE 1 is a partially diagrammatic sectional view illustrating the use of the invention in the measurement of the rate of flow of a fluid such as parotid secretion;

FIGURE 2 is a calibration curve of an instrument of the invention;

FIGURE 3 is a graphical diagram showing at A the output of a drop recorder and at B the output of an instrument of the invention, both as a function of time; and FIGURE 4 is a sectional view of an adapter which may be utilized in the measurement of rate of fluid delivery.

Referring to the drawings, and initially to FIGURE 1 thereof, reference numeral 10 designates generally a flowmeter head of the invention, which in the preferred form comprises a pair of conducting tube members 12 and 14 and an insulating tube member 16, which together define a fluid passage 18. The conducting tube members may be threaded into the insulator from opposite ends thereof and are spaced apart so as to be electrically isolated by the insulator. Tube member 12 contains a small diameter pipe 20 shown concentric with the portion of member 12 adjacent insulator 16 and terminating in an open end adjacent the junction of the tube member 12 and the insulator. Remote from the insulator the tube member 12 extends obliquely away from the pipe 20 and is coupled to a supply tube 22. Pipe 20 is coupled to a supply tube 24. Members 12 and 14 constitute a pair of electrodes which are spaced apart to define a low conductivity path through the fluid passage 18. A measuring circuit 26 is provided in accordance with the invention to determine the conductivity (or reciprocally, the resistance) of the path between the electrodes. The measuring circuit may comprise a conventional arrangement of components for the purpose stated and in the form shown includes a battery 28 and a microammeter 30 connected in series between the electrodes. The conductivity may be recorded as a function of time by a conventional oscillograph recorder 31. The current registered by the microammeter is a function of the conductivity (or resistance) of the path between the electrodes through passage 18. To eliminate extraneous paths the electrodes should be isolated from each other. To this end the tubes 22 and 24 may be formed of insulating material such as polyethylene.

In accordance with the invention, a first substance, preferably a fluid of relatively low conductivity, such as ordinary tap water, is supplied to the flowmeter head from the inlet tube 22, passing through the tube member 12, the insulator 16, and the tube member 14 to provide a fluid stream in passage 18 of low conductivity. Another substance, preferably a fluid of substantially higher conductivity, such as two percent sodium chloride solution, is supplied to the flowmeter head from inlet pipe 24 and is injected by pipe 20 into the stream of low conductivity fluid. In the absence of the high conductivity fluid, the conductivity of the path between the electrodes will be relatively low and of substantially constant value. However, when the high conductivity fluid is injected, a mixing action occurs, the high conductivity fluid diluting the low conductivity fluid as it diffuses outwardly, and the effective conductivity of the path between the electrodes varies. The effective conductivity of the path is a function of the relative rates of flow of the fluids. If, for example, the low conductivity fluid is supplied at a constant rate, within the range of say 1 cc. to 5 cc. per minute, the rate of flow of the high conductivity fluid may be readily determined from the conductivity measurements.

FIGURE 2 is a calibration curve of a typical apparatus of the invention, the ordinate of the curve representing readings on the conductivity meter and the abscissa representing rate of flow of the high conductivity fluid. The curve illustrated is for a flow rate up to 5 cc. per minute. It will be noted that the curve is approximately logarithmic, tending to level off as the flow rate is increased. The measurements can be rendered linear through the use of conventional scale multipliers or logarithmic circuitry, for example. The range of measurement can be varied by altering the size of the mixing chamber between the opposed ends of tube members 12 and 14 (e.g. 60 cu. mm.) or the rate of flow of the carrier (constant flow)

fluid. The response time of the apparatus varies in proportion to the length of member 14.

From the foregoing description, it is apparent that the method and apparatus of the invention permit the measurement of the rate of flow of the high conductivity or the low conductivity substance, if the flow rate of one or the other is held constant, or simply the measurement of the relative rates of flow. The invention is especially applicable to very low rates of flow, at which conventional flowmeters are inaccurate or unreliable. If the test fluid, the flow rate of which is to be measured, has the required high or low conductivity and can be supplied to the flowmeter head of the invention for mixing with another fluid, all without detracting from the functioning of the system in which the fluid is flowing, then the apparatus and method of the invention can provide a direct measurement of flow rate. Where the test fluid cannot be supplied directly to the flowmeter head, an adapter may be utilized to control the injection of a suitable fluid into the mixing chamber at a rate proportional to the rate of flow of the test fluid.

FIGURE 1 illustrates an adapter 32 which may be employed, for example, in a system for measuring the rate of salivary flow from the parotid gland of a human subject. In the form shown the adapter comprises a pair of cylinders 34 and 36 arranged in series. Cylinder 34 is of larger diameter (e.g., 20 cc. capacity) and contains a freely movable piston 38, while cylinder 36 is of smaller diameter (e.g., 5 cc. capacity) and contains a freely movable piston 40. The cylinders may be joined by means of a threaded bushing 42 to provide a liquid-tight junction. Piston 40 has a piston rod 44 fixed thereto and extending into cylinder 34. The remote end of the piston rod is engageable with piston 38 (but need not be connected thereto) so that as piston 38 moves downwardly in FIGURE 1 the motion is transmitted to piston 40 by means of the rod. The upper end of cylinder 34 may be closed by a plug 46, while the lower end of cylinder 36 may be closed by a plug 48. Cylinder 34 is provided with a pair of upper tubes 50 and 52 having shut-off valves 54 and 65, respectively, and a pair of lower tubes 58 and 60 having shut-off valves 62 and 64, respectively. Cylinder 36 is provided with a pair of lower tubes 66 and 68 having a pair of shut-off valves 70 and 72, respectively. In the operating condition valves 54, 62, and 70 are closed, and valves 56, 64 and 72 are open. Tube 60 is connected to a source of low vacuum, e.g., 10 to 15 cm. of mercury, so that suction is applied to the cylinder 34. Tube 52 is connected to a suitable saliva-collecting capsule, such as the type disclosed in the aforementioned Journal article. As saliva is supplied to the space above piston 38, the piston moves downwardly causing the piston 40 to move downwardly at the same rate. A suitable electrolyte in cylinder 36 (e.g., 2% sodium chloride) is forced out of tube 68 connected to the inlet tube 24 of the flowmeter head. Because of the fact that pipe 20 is of small diameter (e.g., a capillary tube) and because of the suction applied to the upper surface of piston 40, the electrolyte does not flow from cylinder 36 until piston 40 is moved downwardly by piston 38. Because of the larger area of piston 38, the suction force on piston 40 does not prevent the downward movement of piston 38, and the electrolyte is injected into the fluid stream at the flowmeter head at a rate proportional to the rate of saliva flow.

The normally closed valves 54, 62 and 70 are utilized in resetting the pistons. To reset pistons 38 and 40, valves 56, 64 and 72 are closed and valves 54, 62 and 70 are opened. Electrolyte is forced through tube 66 into cylinder 36. The upward movement of piston 40 is transmitted to piston 38 by rod 44, expelling saliva above piston 38 through tube 52. The adapter may also be utilized to calibrate the flowmeter of the invention against a drop recorder of the type described in the Journal article. For this purpose the cylinder 34 below piston 38 is filled with tap water or other low conductivity electrolyte through the tubulation 58, and water is expelled through tube 60 when the piston 38 moves downward, suction being applied to the drop detector chamber through which the drops of water pass.

FIGURE 3 illustrates comparative graphs obtained from recording the output of the drop detector (curve A) and the conductivity measuring circuit of the invention (curve B). The curves have identical time (abscissa) axes. Curve A displays drops (pulses) as the ordinate, while curve B displays the conductivity meter reading (calibrated in terms of flow rate) as the ordinate. The correlation between the pulse rate and the conductivity is evident from a comparison of the curves. However, it is also clearly apparent that curve A gives no information between pulses, while curve B displays the flow rate continuously and thus provides complete instantaneous information as to flow rate variations.

The adapter of FIGURE 1 is employed where fluid is collected from a source. The invention may also be utilized where fluid is delivered to a source. For example, in FIGURE 4, an adapter is illustrated with cylinders 74 and 76 connected in parallel, tube 78 leading to the receiver of the fluid to be supplied from cylinder 74, and tube 80 leading to the inlet pipe 24 of the flowmeter head to be supplied with a suitable fluid from cylinder 76. Pistons 82 and 84 are operated in parallel by connected piston rods 86 and 88, so that the amount of electrolyte injected into the fluid passage of the flowmeter is proportional to the amount of fluid supplied to the main system. A suitable proportion is chosen between the capacities of cylinders 74 and 76 commensurate with the operating constants of the flowmeter.

It is thus apparent that the appartus and method of the invention are capable of measuring flow rates accurately and continuously and may be utilized whether the flow is directly accessible or not. The invention is admirably suited to leak detection, whether the leaking substance is injected into the flow passage or controls the injection of another substance into the flow passage.

While preferred embodiments of the invention have been shown and described, it will be apparent to those skilled in the art that changes can be made in these embodiments without departing from the principles and spirit of the invention, the scope of which is defined in the appended claims. For example, a drop recording can be superimposed upon curve B in FIGURE 3 by connecting the drop detector electrodes to members 12 and 14, respectively, to form a shunt path, which should include a series resistor of say, 470K. As each drop falls, the shunting of members 12 and 14 causes a momentary deflection of the recording pen. Accordingly, the foregoing embodiments are to be considered illustrative, rather than restrictive of the invention, and those modifications which come within the meaning and range of equivalency of the claims are to be included therein.

The invention claimed is:

1. A flowmeter comprising a fluid passage having a pair of spaced electrodes defining therebetween a measurement space, means for continuously moving fluid from a first source along said passage and through said measurement space at a predetermined rate, means for injecting a substance from a second source into said measurement space in proportion to a rate to be measured which varies independently of said first rate and for continuously diffusing said substance into the fluid in said measurement space, said substance having an electrical property substantially different from said fluid, and means coupled to said electrodes for continuously deriving an output proportional to the magnitude of said electrical property in said measurement space and for displaying said output as the measured rate of flow.

2. The flowmeter of claim 1, said substance being a fluid and said electrical property being the conductivity of that fluid.

3. The flowmeter of claim 1, said electrodes being tubular and being spaced axially by a tubular insulator, said passage extending through said electrodes and said insulator.

4. The flowmeter of claim 3, said injecting means comprising a tube within said passage and having an outlet adjacent to said insulator.

5. The flowmeter of claim 1, said fluid moving means comprising means for supplying said fluid at a substantially constant rate.

6. The flowmeter of claim 1, said displaying means comprising means for recording said output as a function of time.

7. The flowmeter of claim 1, said means for injecting said substance comprising means for supplying said substance in proportion to the flow of a different substance.

8. The method of determining flow rate, which comprises forming a moving stream of a first substance continuously supplied from a first source at a predetermined rate, continuously diffusing into said stream a second substance having an electrical property different from said first substance and supplied from a second source in proportion to a rate to be determined which varies independently of said predetermined rate, continuously measuring the magnitude of said property at a region of the stream containing the diffusion, and displaying the result of the measurement as the determined rate of flow.

9. The method of claim 8 in which said first substance is a carrier fluid and said second substance is a test fluid of substantially higher conductivity than that of the carrier fluid, and in which the property measured is the conductivity at said region.

10. The method of claim 8 in which said property is conductivity and in which the measurement is conducted between points spaced along the flow direction of said stream.

11. In a flowmeter, a fluid passage having a pair of conducting tube members axially spaced by an insulating tube member, one of said conducting tube members having means for connecting it to a source of flowing material and having therein a pipe terminating adjacent to the junction of said one tube member and said insulating member, said pipe having means for connecting it to a separate source of flowing material with an electrical property different from that of the first-mentioned material, and a measurement circuit connected between said conducting tube members for measuring the value of the electrical property of the combined materials in the space between said conducting tube members.

12. The flowmeter of claim 11, said one tube member extending parallel to said pipe adjacent to said insulating tube member and then obliquely from said pipe.

13. The flowmeter of claim 11, said pipe being coaxial with said passage adjacent to said insulating tube member and having an inner diameter small compared to the inner diameter of said passage.

References Cited

UNITED STATES PATENTS

| | | | |
|---|---|---|---|
| 2,103,741 | 12/1937 | Bencowitz. | |
| 2,656,508 | 10/1953 | Coulter | 324—30 |
| 2,683,986 | 7/1954 | Bartlett et al. | 73—194 |
| 2,739,476 | 3/1956 | Atkins | 73—194 |
| 2,838,378 | 6/1958 | Shawham | 324—30 X |

WALTER L. CARLSON, *Primary Examiner.*

RUDOLPH V. ROLINEC, *Examiner.*

W. H. BUCKLER, E. E. KUBASIEWICZ,
*Assistant Examiner.*